Nov. 15, 1955

J. A. McKIBBEN 2,723,443

ELECTRIC MOTOR STATOR STRIPPING MACHINE

Filed Sept. 8, 1952

INVENTOR.
John A. McKibben.
BY
Fishburn & Mullendore
ATTORNEYS.

Nov. 15, 1955 J. A. McKIBBEN 2,723,443
ELECTRIC MOTOR STATOR STRIPPING MACHINE
Filed Sept. 8, 1952 3 Sheets-Sheet 2

INVENTOR.
John A. McKibben.
BY
Fishburn + Mullendore
ATTORNEYS.

Nov. 15, 1955     J. A. McKIBBEN     2,723,443

ELECTRIC MOTOR STATOR STRIPPING MACHINE

Filed Sept. 8, 1952     3 Sheets-Sheet 3

INVENTOR.
John A. McKibben.
BY
Fishburn + Mullendore
ATTORNEYS.

United States Patent Office 2,723,443
Patented Nov. 15, 1955

2,723,443

ELECTRIC MOTOR STATOR STRIPPING MACHINE

John A. McKibben, Independence, Kans.

Application September 8, 1952, Serial No. 308,416

1 Claim. (Cl. 29—69)

This invention relates to electric motor stator stripping machines and more particularly to a machine for supporting the stationary portion of an electric motor, cutting the wires forming the coils therein and pulling said wires therefrom.

Electric motors of the induction or like type have a stationary frame in which is located a laminated structure having a central bore and a plurality of spaced openings extending therethrough longitudinally of the motor or parallel to the axis of rotation of the armature which is rotatably supported in said central bore. Wires are threaded through the openings and form a coil or winding for the motor. When the motor becomes inefficient or inoperative due to short circuiting of the wires in the coils or other causes, such as deteriorated, water-soaked or oil-soaked insulation, it is necessary to discard the motor or rebuild same by replacing the stator coils or windings. Clipping of the wires and pulling them from the openings in the laminated structure has been laborious, time-consuming and expensive.

The objects of the present invention are to provide an electric motor stator stripping machine with a motor stator support and a circular cutter on a hinged arm for cutting the stator wires in a plane substantially flush with one side of the laminated structure of the stator and wire pulling means for pulling the cut wires from the stator; to provide such a machine with a plurality of columns carrying the motor stator support and a trackway above said support with a hoist on said trackway for lifting the motor stator and also for applying forces for pulling the wire from the stator; to provide a motor driven cutter on a swinging support consisting of hingedly connecting arms one of which is connected to the cutter motor support and the other pivotally mounted on a sleeve movably mounted on a column whereby the cutter may be operated and maneuvered to cut the wires of a motor stator; and to provide an electric motor stator stripping machine which is economical to manufacture, sturdy of structure and easily operated and maneuvered for efficiently cutting and removing wires from motor stators preparatory to rewinding the coils thereof.

In accomplishing these and other objects of the present invention, I have provided improved details of structure, the preferred forms of which are illustrated in the accompanying drawings, wherein:

Fig. 1 is a perspective view of an electric motor stripping machine constructed in accordance with the present invention.

Figure 2:
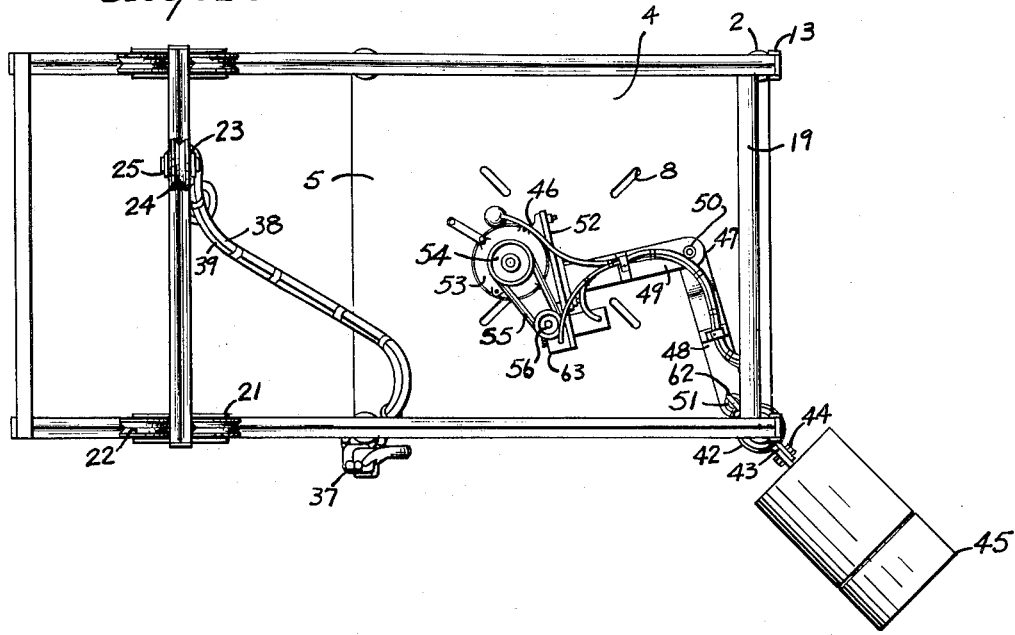
Fig. 2 is a plan view of the machine.
Figure 3:
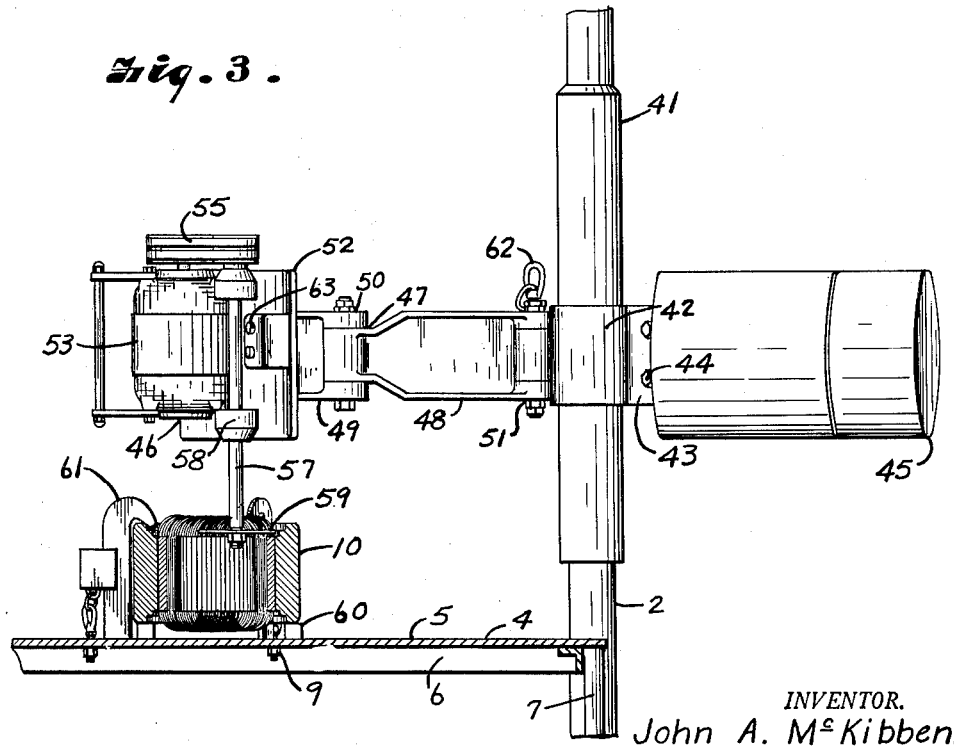
Fig. 3 is an enlarged detail elevation of the wire cutting mechanism and the support therefor in position for the cutter to cut the wires of a stator secured on a table for supporting same.
Figure 4:
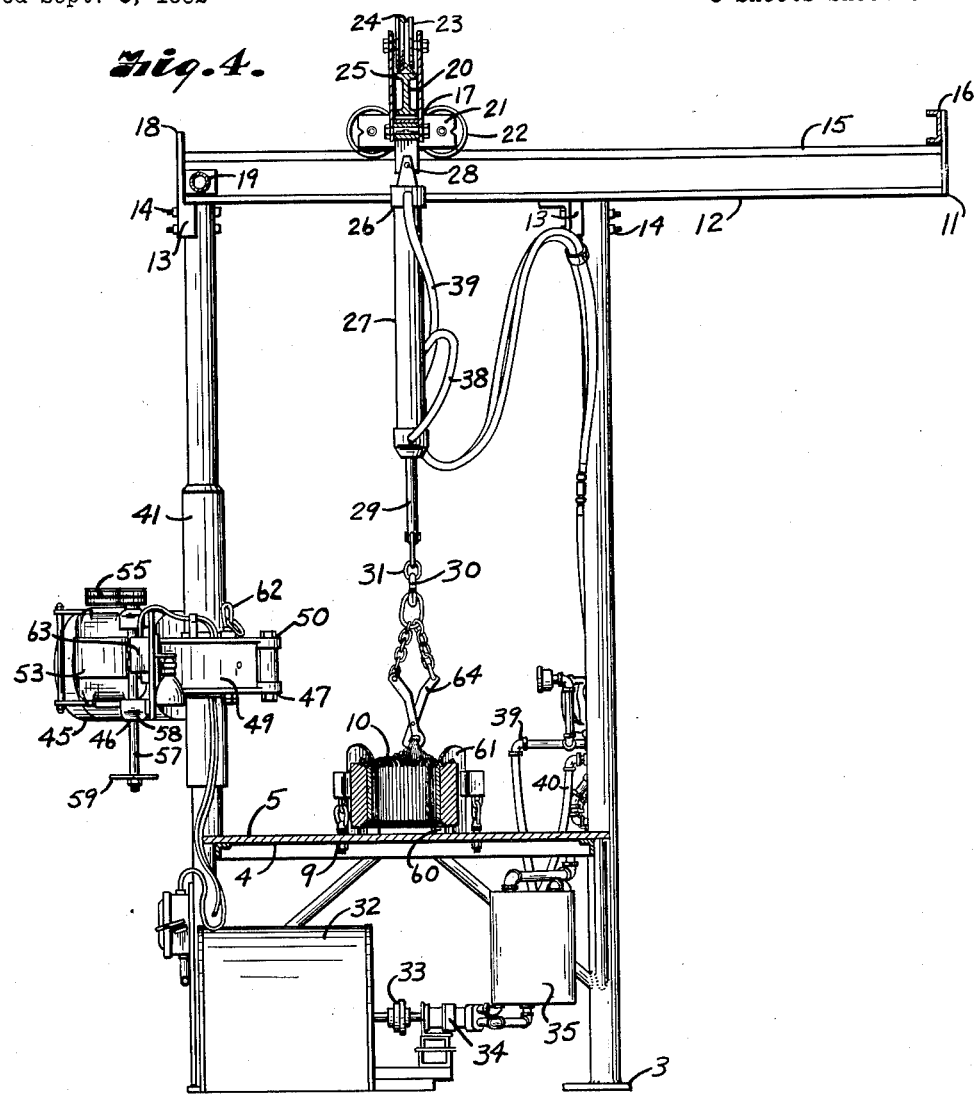
Fig. 4 is a vertical sectional view through the stator stripping machine with the parts thereof in position for pulling the wires from the stator.
Figure 5:
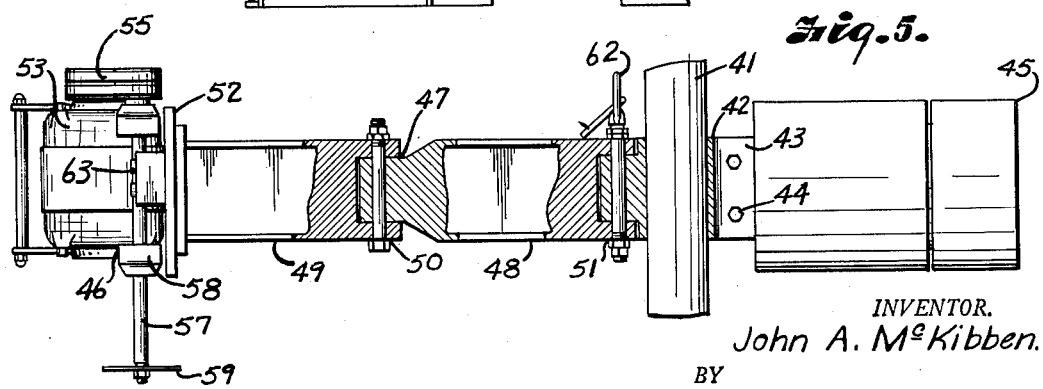
Fig. 5 is an elevational view of the cutter, drive therefor and supporting arms, portions being broken away to show the pivotal connections of the arms.

Referring more in detail to the drawings:

1 designates an electric motor stator stripping machine having a plurality of spaced, vertically arranged columns 2, preferably four in number, each having feet 3 on the lower end thereof adapted to be secured to a floor or other support. A table member 4 is carried by the columns in spaced relation to the feet 3, said table preferably consisting of a horizontally arranged panel 5 having reinforcing members 6, such as angles, suitably secured to the underside of the panel 5 adjacent the side edges thereof. The corners of the panel and the reinforcing members 6 are suitably secured as by welding to the columns 2. Diagonal braces 7 have ends suitably secured to the reinforcing member 6 and panel 5 and other ends secured to the column to provide a rigid structure. The panel 5 preferably has a plurality of slots 8 suitably arranged therein for receiving fastening devices 9 to aid in securing an electric motor stator 10 on the table as later described.

A trackway 11 is mounted on the upper ends of the columns, said trackway preferably consisting of two rail members 12, each extending across the top of two of the column members 2 and suitably secured thereto by brackets 13 and fastening devices 14, said rail members being parallel and extending beyond certain of the columns to provide a trackway extension 15. The extension portion of the trackway has a transverse member 16 connecting the ends of the rails to tie same together and also serve as a stop for a hoist carriage 17 operating on the trackway. At the other end of the trackway the brackets 13 extend above the rails as at 18 to also form a stop for the hoist carriage, and adjacent that end of the trackway the rail members are connected by a transverse member 19 to provide a rigid structure. The hoist carriage 17 consists of a transverse rail 20 having spaced ears 21 extending laterally adjacent the ends thereof, of, rollers 22 being suitably mounted on the ears 21 and adapted to engage the upper surface of the rails 15, said rollers 22 preferably having flanges to limit movement of the carriage laterally of the rails 15.

A trolley 23 operates on the rail 20 and preferably consists of a roller 24 rotatably mounted in a yoke member 25 which straddles the rail 20 and depends therefrom. Carried by the yoke member 25 is a hoist 26 preferably consisting of an hydraulic jack having a cylinder 27, one end of which is suitably mounted as at 28 on the yoke 25, and a piston rod 29 extendable through the other or lower end of the cylinder, a snap-type hook 30 being connected to the end of the piston rod as by links 31.

A suitable motor (not shown) is arranged in a housing 32 under the table member 4 and has driving connection through a coupling 33 to an hydraulic pump 34 having an intake connected with a reservoir 35 and a discharge connected by suitable piping 36 to a control valve 37 to selectively supply fluid pressure through tubes 38 and 39 to the opposite ends of the cylinder 27, said valve and connections being such that when fluid pressure is applied to one end of the cylinder 27 the other end of said cylinder is connected through the valve 37 to a return 40 leading to the reservoir 35 whereby operation of the control valve 37 selectively moves the piston rod 29 up or down relative to the cylinder 27 to raise or lower items engaged with the snap hook 30.

One of the columns 2 has an enlarged, cylindrical portion 41 thereon above the table member 4. Extending around the enlarged cylindrical portion 41 is a split sleeve 42 slidably engaging the cylindrical portion and having flanges 43 provided with fastening devices 44 for tightening the sleeve onto the enlarged cylindrical portion to secure said sleeve in selected positions thereon. Mounted on one of the flanges 43 is a weight 45 extending outwardly from the column to serve as a counterbalance for a cutting mechanism 46 and supporting member 47 therefor which extends outwardly over the table. The supporting member 47 consists of arms 48 and 49 having adjacent ends hingedly connected as at 50. The other end of the arm 48 is pivotally connected as at 51 to the split sleeve 42 for swinging movement of the arm 48 about a vertical axis. The hinge connection between the arms 48 and 49 is also arranged for swinging movement of the arm 49 relative to the arm 48 about a vertical axis. The other end of the arm 49 has a plate 52 secured thereto, said plate carrying a motor 53 provided with a pulley 54 on the armature shaft, which pulley is operatively engaged by a belt 55 with a pulley 56 fixed on a shaft 57 rotatably mounted in spaced bearings 58 on the plate 52 for driving the shaft and effecting rotation thereof about a vertical axis which is perpendicular to the table member 4. A circular cutter 59 is fixed to the lower end of the shaft 57.

In operating a machine constructed as described, the stator of an electric motor is moved adjacent the machine and under the extension of the trackway 11. The hoist carriage is rolled out on the extension and the control valve 37 operated to extend the piston rod downwardly from the cylinder 27. The motor stator is then connected by a chain or other suitable lifting mechanism to the hook 30 and the control valve 37 operated to move the piston rod 29 upwardly to raise the stator above the level of the table member. The hoist carriage 17 is then moved on the trackway 11 to position the motor stator over the table member 4 and the valve member 37 actuated whereby the hoist lowers the stator onto said table. Blocks 60 are arranged under the motor stator to level same and clamp members 61 hooked over the stator and tightened down by the fastening devices 9 to hold the motor stator securely relative to the table. The hoist and carriage therefor are then moved until the hook 30 can be engaged with a ring member 62 fixed relative to the split sleeve 42. The fastening devices 44 are loosened and the valve 37 actuated to raise a cutting apparatus and support therefor. The arms 48 and 49 are swung to position the cutter substantially axially of the motor stator and the valve 37 actuated to lower the cutter and supporting arms therefor until a lower surface of the cutter is substantially flush with the upper side of the laminated structure of the stator. The fastening devices 44 are tightened to secure the split sleeve 42 on the enlarged portion 41 to maintain the relationship of the cutter relative to the stator. A switch 63 connected to a source of electric current is then actuated to energize the motor 53 to drive the cutter 59 and by swinging the arms 48 and 49 to move the cutter around the stator the wires of the stator winding are severed substantially flush with one side of the laminated structure of the stator. The hoist and carriage therefor are then manipulated to connect the hoist to the ring 62, the fastening devices 44 are loosened, and the split sleeve and arms thereon are arranged to raise the cutting device from the stator. The fastening devices 44 are again tightened and the motor swung on the arms 48 and 49 to a position out of the way of the operator. The clamps 60 are then loosened and the hoist operated to pick up the stator and turn same over. The blocks 59 are again placed under the stator and the clamps 61 applied to secure the stator to the table. Suitable tongs 64 are then applied to the hook 30 and by actuation of the valve 37 the hoist is manipulated to engage the tongs with the wires of the winding in the stator and by applying lifting force to the tongs 64 the wires are pulled from the openings in the stator. After all the wires are pulled from the stator the clamps 61 are again loosened and the stator removed from the machine and said stator is then in condition for rewinding with new wiring.

It is believed obvious that I have provided a sturdy, efficient machine for stripping the wires from an electric motor stator in an inexpensive, time-saving manner.

What I claim and desire to secure by Letters Patent is:

A machine for stripping wires from electric motor stators comprising, a plurality of spaced upright columns, a horizontally arranged table having a plurality of slots therein extending between and supported by the columns, clamp means movable in the table slots and adapted to secure an electric motor stator on the table, a sleeve slidable on one of the columns for vertical movement relative to the table, means for securing the sleeve in selected positions on said one of the columns, an arm having one end hingedly connected to the sleeve for swinging movement about a vertical axis, a second arm having one end hingedly connected to the other end of the first named arm for swinging movement about a vertical axis, a bracket fixed adjacent the other end of the second arm, a motor carried by the bracket, a vertical shaft rotatably supported on the bracket for rotation about a vertical axis, a circular cutter fixed on said shaft adjacent the lower end thereof for operating in a plane parallel to the table, means operatively connecting the motor and shaft for driving the shaft for rotating said shaft and the cutter thereon whereby swinging movement of the arms will move the cutter to cut the wires of a stator secured on the table, and means supported on the columns for effecting vertical movement of the sleeve relative to the table for selectively positioning the plane of the cutter relative to the table.

References Cited in the file of this patent

UNITED STATES PATENTS

| Number | Name | Date |
| --- | --- | --- |
| 400,818 | Atwater | Apr. 2, 1889 |
| 1,083,160 | Villinger | Dec. 30, 1913 |
| 1,403,962 | Jolly | Jan. 17, 1922 |
| 1,559,926 | Adair | Nov. 3, 1925 |
| 1,620,466 | Jones | Mar. 8, 1927 |
| 1,853,448 | Mykleby | Apr. 12, 1932 |
| 2,007,563 | De Koning | July 9, 1935 |
| 2,046,490 | Schuirmann | July 7, 1936 |
| 2,113,712 | Robinson | Apr. 12, 1938 |